No. 631,587. Patented Aug. 22, 1899.
A. J. RUDOLPH.
MACHINE FOR FORMING BOTTLE NECKS.
(Application filed Feb. 17, 1899.)
(No Model.)
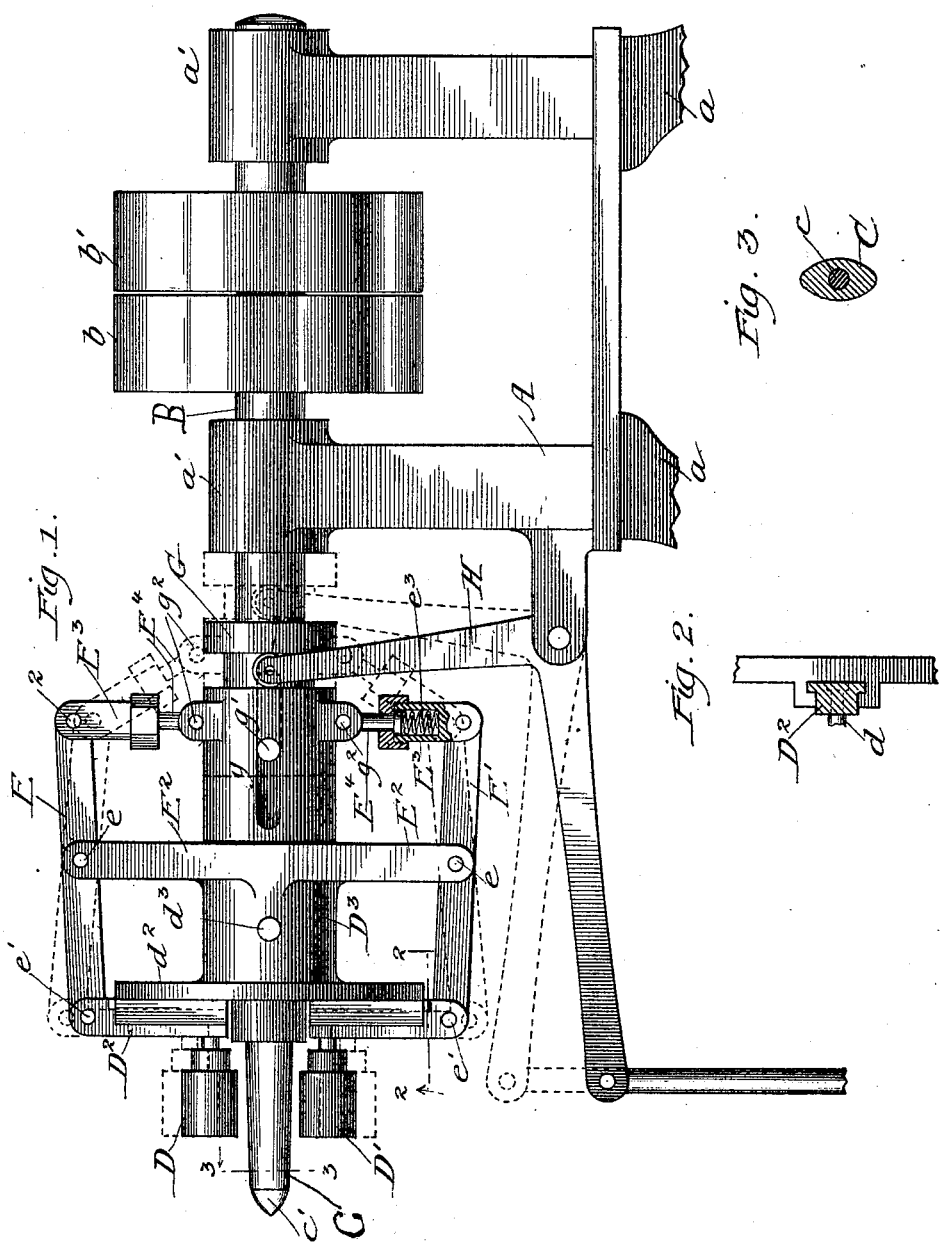

UNITED STATES PATENT OFFICE.

ALEXANDER J. RUDOLPH, OF CHICAGO, ILLINOIS.

MACHINE FOR FORMING BOTTLE-NECKS.

SPECIFICATION forming part of Letters Patent No. 631,587, dated August 22, 1899.

Application filed February 17, 1899. Serial No. 705,880. (No model.)

*To all whom it may concern:*

Be it known that I, ALEXANDER J. RUDOLPH, a citizen of the United States, residing at Chicago, in the county of Cook and State of Illinois, have invented certain new and useful Improvements in Machines for Forming Bottle-Necks, of which the following is a specification.

My invention relates to that class of machines which are adapted by the use of rolls or other mechanism to form the necks of glass bottles while such bottle-necks are in a heated ductile condition.

The object of the invention is to provide a simple, economical, and efficient machine for forming bottle-necks; and the invention consists in the features, combinations, and details of construction hereinafter described and claimed.

In the accompanying drawings, Figure 1 is a side elevation, partly in section, of a machine constructed in accordance with my improvements; Fig. 2, a sectional detail taken on the line 2 of Fig. 1, and Fig. 3 a transverse sectional detail taken through the forming-plug on line 3 of Fig. 1.

In constructing a machine in accordance with my improvements I make a head-stock A of the desired size, shape, and strength to hold the operative and other parts in position. This head-stock may be provided with standards $a$ (shown in broken elevation in Fig. 1) or may be placed upon a bench in any suitable manner.

To form and size a bottle-neck, a rotatable mandrel B is provided, which has its bearings in boxes $a'$ of the head-stock and which is provided with a tight and loose pulley $b$ and $b'$, by which power and motion are transmitted to the rotatable mandrel. The front portion of the rotatable mandrel is provided with a forming-plug C, secured therein in any desired manner, and which is adapted through the rotations of the mandrel to size and finish the inner surface of the bottle-neck. This forming-plug in cross-section, as shown in Fig. 3, comprises an elliptical roll mounted upon a supporting-pin $c$, which has an arrow-head $c'$ at the front portion thereof.

To size, shape, and finish the exterior surface of the bottle neck and lip, two forming-rolls D and D' are provided and rotatably mounted on pins $d$, which are secured in radially-movable slides $D^2$, mounted in guides on a rotatable disk $d^2$. This disk forms a portion of a sleeve or shell $D^3$, which is secured to the mandrel, so as to rotate therewith, by means of a pin $d^3$.

To operate the radially-movable slides, a pair of swinging or working-beam levers E and E' are provided, which are pivotally mounted at $e$ on the lugs $E^2$, which form a portion of the shell $D^3$. The outer ends of these pivotal levers are pivotally secured to the radially-movable slides at $e'$ and their inner ends to tension-links, which are made in two parts $E^3$ and $E^4$, telescopically secured together, as is shown clearly in Fig. 1. These tension-links, as above stated, are telescopically secured together and a coil-spring $e^3$ is inserted between them, so as to permit the levers to be extended or collapsed and primarily for the purpose of providing a uniform pressure on the glass of the bottle-neck and allow it to be formed under a uniform pressure and at the same time permit the rolls to move over hard obstacles without destroying any of the parts. The inner ends of these tension-links are pivotally mounted on or pivotally secured to an operating-sleeve G, which is slidingly mounted on the rotatable mandrel and which by means of the slot $g$ and the pin $g'$ on the mandrel is rotated simultaneously with the mandrel. This operating-sleeve is provided with an annular groove $g^2$, into which the yoke of a bell-crank lever H fits, so that this bell-crank lever can be used to move the operating-sleeve forward and backward, and thereby cause the forming-rolls to move toward or from the axis of the mandrel. From an inspection of the drawings it will be seen that the outer end of the operating-sleeve G abuts against the inner end of the shell $D^3$ when such sleeve is in its outer position.

I claim—

1. In a machine of the class described, the combination of a rotatable mandrel, a forming-plug in the end thereof, roll mechanism for forming the exterior of a bottle-neck, an operating-sleeve slidingly mounted on the mandrel, lever mechanism interposed between the sleeve and roll mechanism, and spring mechanism arranged to transmit power and motion of the operating-sleeve under tension through the lever mechanism to the forming-roll mechanism, substantially as described.

2. In a machine of the class described, the combination of a rotatable mandrel, a forming-plug mounted in the front end thereof, roll mechanism for forming the exterior of the bottle-neck, a swinging lever for operating the forming-roll, an operating-sleeve slidingly mounted on the mandrel, a link made in at least two parts slidingly fitted together having a tension-spring interposed between the parts of the link and pivotally secured to the swinging lever to operate the forming-rolls under tension, substantially as described.

3. In a machine of the class described, the combination of a rotatable mandrel, a forming-plug in the end thereof, roll mechanism for forming the exterior of the bottle-neck, a slide upon which each roll is mounted adapted to be moved toward or from the axis of the mandrel, a swinging lever having one end connected with the slide, an operating-sleeve slidingly mounted on the rotatable mandrel, and a link made in two parts slidingly fitted together and pivotally connected with the operating-sleeve and the pivoted lever, and a spring interposed between the sections of the link to operate the rolls under tension, substantially as described.

4. In a machine of the class described, the combination of a rotatable mandrel a forming-plug in the front part thereof comprising a supporting-pin secured in the mandrel and an elliptical roll mounted thereon to form and finish the interior of a bottle-neck, two rolls for forming the exterior of the bottle-neck, a radially-movable slide for each forming-roll, a swinging lever pivotally secured to each slide, an operating-sleeve mounted on the mandrel, a telescopic link for each pivotal lever and pivotally secured thereto and to the operating-sleeve, and a spring interposed between the sections of the telescopic link, substantially as described.

5. In a machine of the class described, the combination of a rotatable mandrel provided with a forming-plug in the end thereof, a radially-movable slide provided with mechanism to form the exterior of a bottle-neck, a swinging or working-beam lever pivotally connected with the radially-movable slide and with a portion adapted to rotate with the mandrel, a reciprocating operating-sleeve slidingly mounted on the mandrel, and link mechanism connecting the sleeve with the working-beam lever, substantially as described.

ALEXANDER J. RUDOLPH.

Witnesses:
THOMAS F. SHERIDAN,
THOMAS B. McGREGOR.